(12) United States Patent
Kim et al.

(10) Patent No.: US 6,999,226 B2
(45) Date of Patent: Feb. 14, 2006

(54) VARIABLE FOCAL LENGTH LENS COMPRISING MICROMIRRORS WITH ONE DEGREE OF FREEDOM TRANSLATION

(75) Inventors: Tae Hyeon Kim, Taejeon (KR); Sang Hyune Baek, Suwon (KR)

(73) Assignees: Angstrom Inc., Suwon (KR); Stereo Display Inc., Fullerton, CA (US)

( * ) Notice: Subject to any disclaimer, the term of this patent is extended or adjusted under 35 U.S.C. 154(b) by 0 days.

(21) Appl. No.: 10/857,280

(22) Filed: May 28, 2004

(65) Prior Publication Data

US 2005/0275928 A1    Dec. 15, 2005

(51) Int. Cl.
*G02B 26/00*    (2006.01)
*G02B 26/08*    (2006.01)

(52) U.S. Cl. ............... 359/291; 359/290; 359/295; 359/298; 359/225; 359/226

(58) Field of Classification Search ......... 359/290, 359/291, 295, 298, 225, 226, 625, 626, 846; 396/89; 40/582; 372/22
See application file for complete search history.

(56) References Cited

U.S. PATENT DOCUMENTS

| | | | |
|---|---|---|---|
| 2,002,376 A | 5/1935 | Mannheimer | |
| 4,834,512 A | 5/1989 | Austin | |
| 5,986,811 A | 11/1999 | Wohlstadter | |
| 6,111,900 A | 8/2000 | Suzudo | |

2002/0102102 A1    8/2002    Watanabe et al.

OTHER PUBLICATIONS

Kaneko et al., 2000, "Quick Response Dynamic Focusing Lens using Multi-Layered Piezoelectric Bimorph Actuator," Proceeding of SPIE vol. 4075: 24-31.
Cho, 2003, "Fast-response Variable Focusing Micromirror Array Lens," Proceeding of SPIE vol. 5055: 278-286.

*Primary Examiner*—Georgia Epps
*Assistant Examiner*—Jack Dinh
(74) *Attorney, Agent, or Firm*—Park Law Firm; John K. Park

(57) ABSTRACT

A variable focal length lens comprising micromirrors with pure translation is invented. The lens consists of many micromirrors and actuating components. The array of micromirrors with pure translation makes all lights scattered from one point of an object have the same periodic phase and converge at one point of image plane by using Fresnel diffraction theory. The actuating components control the positions of micromirrors electrostatically and/or electromagnetically. The optical efficiency of the micromirror array lens is increased by locating a mechanical structure upholding micromirrors and the actuating components under micromirrors. The known semiconductor microelectronics technologies can remove the loss in effective reflective area due to electrode pads and wires. The lens can correct aberration by controlling each micromirror independently. Independent control of each micromirror is possible by known semiconductor microelectronics technologies. The micromirror array can also form arbitrary shape and/or size of a lens.

28 Claims, 3 Drawing Sheets

(a)            (b)

(a) (b)

VARIABLE FOCAL LENGTH LENS COMPRISING MICROMIRRORS WITH ONE DEGREE OF FREEDOM TRANSLATION

BACKGROUND OF THE INVENTION

The present invention relates to a variable focal length lens comprising micromirrors with translational motion and operational methods for the lens.

A widely used conventional variable focal length system is the one using two refractive lenses. It has complex driving mechanisms to control the relative positions of refractive lenses and a slow response time. Alternatively, variable focal length lenses have been made. Variable focal length lenses can be made by changing the shape of the lens, as is found in the human eye; this method has been used in lenses made with isotropic liquids. Other lenses have been made of electrically variable refractive index media to create either a conventional lens or a gradient index lens by means of a voltage gradient. The electrically variable refractive index allows the focal length of the lenses to be voltage controlled. Among them, the most advanced one is liquid crystal variable focal length lens, which has a complex mechanism to control the focal length. Its focal length is changed by modulating the refractive index. Unfortunately, it has a slow response time typically on the order of hundreds of milliseconds. Even though the fastest response liquid crystal lens has the response time of tens of milliseconds, it has small focal length variation and low focusing efficiency.

To solve the disadvantages of the conventional focal length lens, a fast-response micromirror array lens was proposed. The details of the fast-response micromirror array lens are described in J. Boyd and G. Cho, 2003, "Fast-response Variable Focusing Micromirror Array Lens," *Proceeding of SPIE* Vol. 5055: 278–286. The paper is incorporated by reference into this disclosure as if fully set forth herein. The micromirror array lens mainly consists of micromirrors and actuating components. The focal length of the micromirror array lens is varied by both translation and rotation of each micromirror. The micromirror with both translation and rotation has a complex mechanical structure, actuating components, and coupled motion. Therefore, fabrication, accurate control, and large motions of the micromirror are difficult. To be applied more easily and widely, a micromirror array lens with much simple mechanical structure, and actuating components are necessary. Therefore, a micromirror array lens with only translational motion is invented.

SUMMARY OF THE INVENTION

The present invention contrives to solve the disadvantages of the conventional variable focal length lens.

The objective of the invention is to improve complexity of the previous micromirror array lens in its design and control. It extends advantages and applications of the lens.

According to Fresnel diffraction theory, a focus can be obtained by properly modulating the phase of wave front like as the zone plate and diffraction lens (Hect, "Optics" 2nd ed. Chap. 10, Addison-Wesley, 1987). The invention also works as a diffraction lens. But, the invention is a variable focal length lens comprising many micromirrors to reflect the light and actuating components to control positions of the micromirrors. Because the light is a wave, one can make a focus by modulating all light reflected from the micromirrors have the same phase at an intended point (focus). In order to do this, the micromirrors are electrostatically and/or electromagnetically controlled to have desired positions by actuating components.

Surface of the micromirror is made of metal, metal compound, or high reflective dielectric coatings. Many known microfabrication processes can make the surface of the micromirror to have high reflectivity.

As mentioned, very fast variable focal length micromirror array lens is proposed by J. Boyd and G. Cho. A diffraction-limited lens is formed by controlling both translation and rotation of each micromirror. The micromirror with both translation and rotation has a complex mechanical structure, actuating components and coupled motion. Therefore, fabrication, accurate control, and large motions of the micromirror are difficult.

A micromirror array lens with only translation of micromirror has a much simple mechanical structures and actuating components. The micromirror array lens formed by the control of only translation has relatively larger aberration. Even though the quality of the lens formed by control of only translation is lower than the lens formed by control of both rotation and translation, it can be used because of advantages which its structure and control is much simpler than the lens formed by control of both rotation and translation. If the size of micromirror is small enough, a diffraction-limited variable focal length lens comprising micromirrors with pure translation is possible.

The micromirror array lens can be formed by a polar array of the micromirrors. For the polar array, each micromirror has a fan shape to increase an effective reflective area, so that the optical efficiency increases. The optical efficiency of the micromirror array lens can be improved by locating a mechanical structure upholding micromirrors and the actuating components under micromirrors to increase an effective reflective area. Electric circuits to operate the micromirrors can be replaced with known semiconductor microelectronics technologies such as MOS and CMOS. Applying the microelectronics circuits under micromirror array, the effective reflective area can be increased by removing necessary area for electrode pads and wires.

The lens can correct aberration, which is caused by optical effects due to the medium between the object and its image or is caused by defects of a lens system that cause its image to deviate from the rules of paraxial imagery, by controlling each micromirror independently. Independent control of each micromirror is also possible by replacing electric circuits required for control with known MOS or CMOS technologies and fabricating the circuits underneath the micromirrors using known microfabrication methods.

To achieve the above objective, the present invention specifically provides a variable focal length lens comprising a plurality of micromirrors with one degree of freedom translation.

The translation of the micromirrors is controlled to change the focal length of the lens.

All of the micromirrors are arranged in a flat plane.

The micromirrors are arranged to form one or more concentric circles to form the lens.

The micromirrors on each of the concentric circles are controlled by one or more electrodes corresponding to the concentric circle.

The micromirror may have a fan shape, a hexagonal shape, a rectangular shape, a square shape, and a triangle shape etc.

The reflective surface of the micromirror is flat.

The micromirrors are controlled independently.

The micromirrors are actuated by electrostatic force and/or electromagnetic force.

A mechanical structure upholding micromirrors and actuating components are located under the micromirrors.

A control circuitry is constructed under the micromirrors by using semiconductor microelectronics technologies.

The surface material of the micromirror is the one with high reflectivity including metal.

The lens is an adaptive optical component. Therefore, the lens compensates for phase errors of light due to the medium between an object and its image; corrects aberrations; corrects the defects of an imaging system that cause the image to deviate from the rules of paraxial imagery. Also an object which does not lie on the optical axis can be imaged by the lens without macroscopic mechanical movement.

The lens is controlled to satisfy the same phase condition for each wavelength of Red, Green, and Blue (RGB), respectively, to get a color image.

Alternatively, the lens is controlled to satisfy the same phase condition for one wavelength among Red, Green, and Blue (RGB) to get a color image.

Alternatively, the same phase condition for color imaging is satisfied by using the least common multiple of wavelengths of Red, Green, and Blue lights as an effective wavelength for the phase condition.

The advantages of the present invention are: (1) the micromirror array lens has a very fast response time because each micromirror has a tiny mass; (2) the lens can have a large size aperture without losing optical performance. Because the micromirror array lens consists of discrete micromirrors, the increasing of the lens size does not cause the increasing of aberration caused by shape error of a lens; (3) the lens has a low cost because of the advantages of its mass productivity; (4) the lens can correct aberration; (5) the lens makes the focusing system much simple.

Although the present invention is briefly summarized, the full understanding of the invention can be obtained by the following drawings, detailed description, and appended claims.

DESCRIPTION OF THE FIGURES

These and other features, aspects and advantages of the present invention will become better understood with references to the accompanying drawings, wherein.

DETAILED DESCRIPTION OF THE INVENTION

Figure 1:
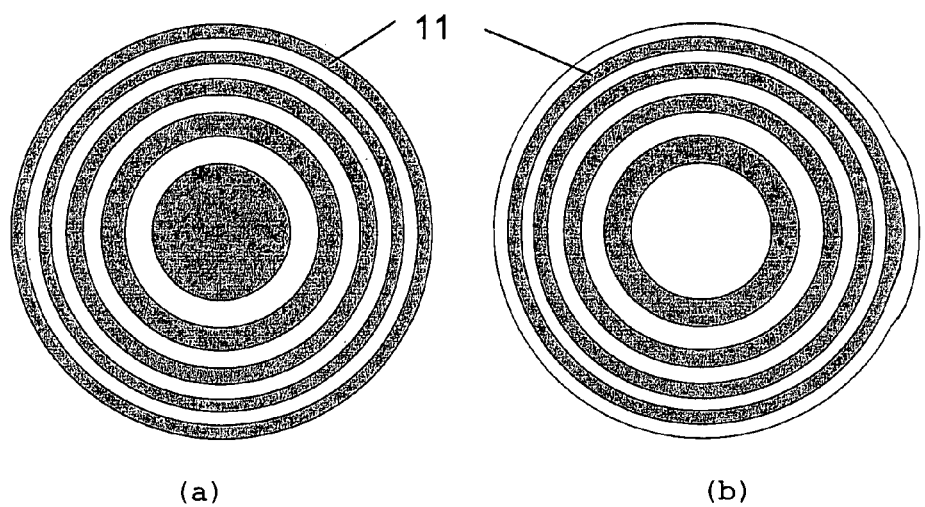
FIG. 1 is a schematic diagram showing the zone plat, which can make a focus by Fresnel diffrection theory.

FIG. 1 shows zone plates. Gray regions (zones) 11 are the area where lights are blocked. In FIG. 1 (a), the left plate, light blocked at even zones and in FIG. 1 (b), the right plate, lights are blocked at odd zones. But two plate have same focus and intensity. Every zone have the same area and optical path length (OPL) difference between from every adjacent zones to focal point is half wavelength. Focal length is changed by changing the width of zone.

Figure 2:
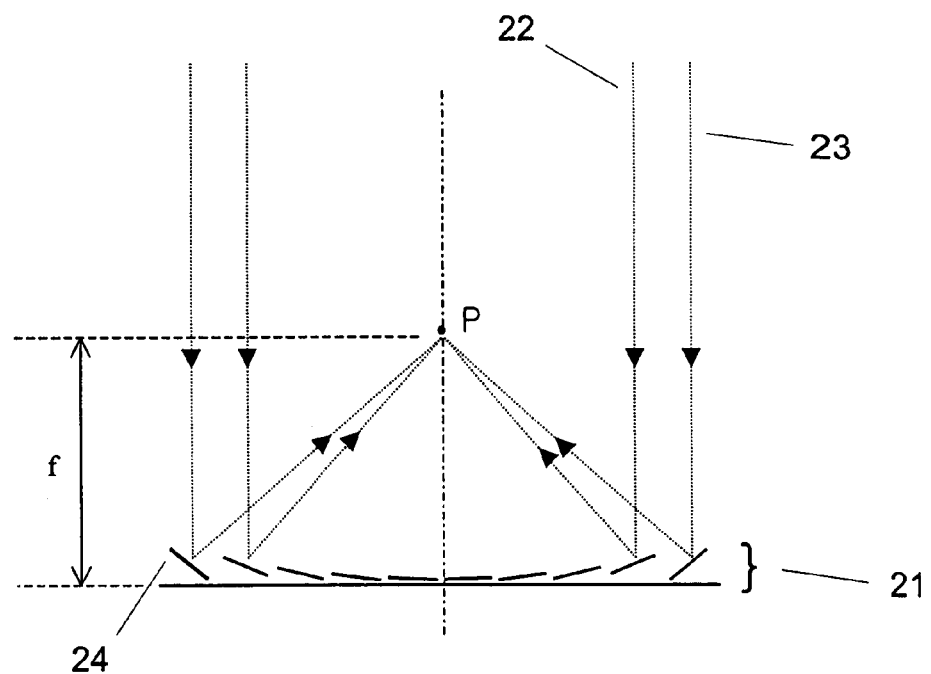
FIG. 2 is a schematic diagram showing how a conventional micromirror array lens works as a lens.

FIG. 2 illustrates the principle of the conventional micromirror array lens. There are two conditions to make a perfect lens. The first is the converging condition that all light scattered by one point of an object should converge into one point of the image plane. The second is the same phase condition that all converging light should have the same phase at the image plane.

A micromirror array arranged in flat plane can satisfy two conditions to be a lens. Each of the micromirrors rotates to converge the scattered light. Because all micromirrors of the conventional micromirror array lens are arranged in a flat plane as shown in FIG. 2, the optical path length of lights converged by rotation of the micromirrors is different. Even though the optical path length of converging light is different, the same phase condition can be satisfied by adjusting the phase because the phase of light is periodic. FIG. 2 also illustrates how the conventional micromirror array lens 21 images. Arbitrary scattered lights 22, 23 are converged into one point P of the image plane by controlling the positions of the micromirrors 24. The phases of arbitrary light 22, 23 can be adjusted to be same by translating the micromirrors 24. The required translational displacement is at least half of the wavelength of light. The focal length f of the conventional micromirror array lens 21 is changed by controlling the rotation and/or translation of each micromirror 24.

Figure 3:
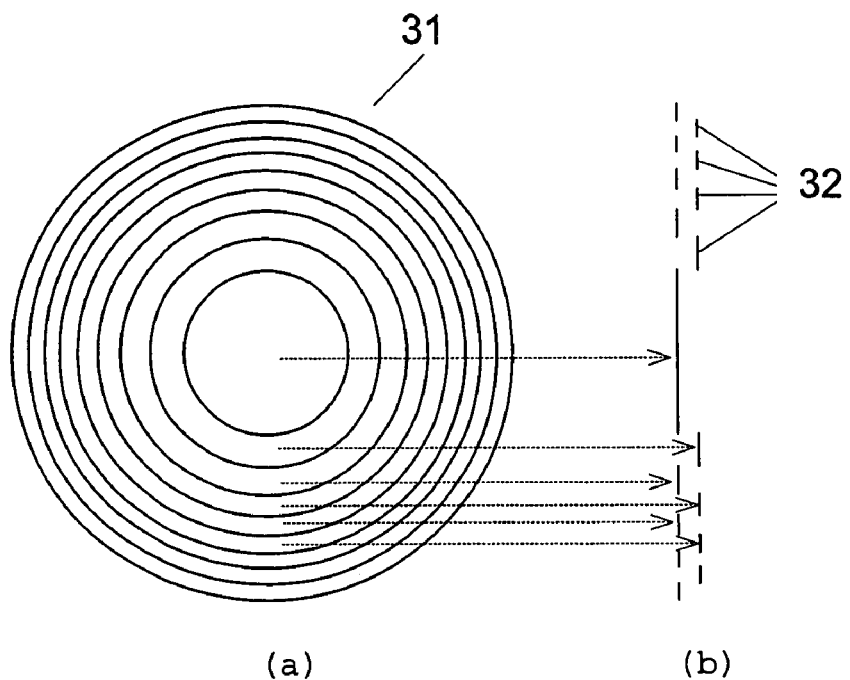
FIG. 3 is a schematic diagram showing in-plane and cross-section of a micromirror array lens using Fresnel diffraction.
Figure 4:
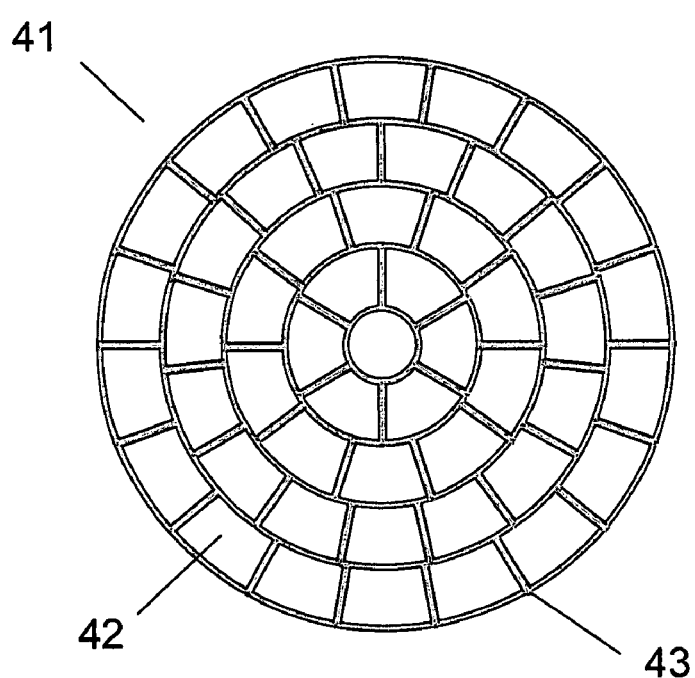
FIG. 4 is an in-plane schematic view showing one of the structures of the micromirror array lens.

FIG. 3(a) shows a lens comprising odd and even zone plate 31. To compensate half wavelength phase difference between two zone plate, the odd zone 32 is translated. The whole surface consists of micromirrors which can be translated along the normal axis to the plane. Because the micromirror reflects light, required translation distance of the micromirror is quarter wavelength to make half wavelength phase difference. FIG. 4 shows an example of the in-plane view of the micromirror array lens 41. The micromirror 42 has the same function as a mirror. Therefore, the reflective surface of the micromirror 42 is made of metal, metal compound, or high reflective dielectric coatings. Many known microfabrication processes can make the surface have high reflectivity. Each micromirror 42 is electrostatically and/or electromagnetically controlled by the actuating components 43 as known. In case of an axisymmetric lens, the micromirror array lens 41 has a polar array of the micromirrors 42. Each of the micromirrors 42 has a fan shape to increase an effective reflective area, which increases optical efficiency. The micromirrors are arranged to form one or more concentric circles and the micromirrors on same concentric circle can be controlled by the same electrodes with concentric circle shape.

The mechanical structure upholding each reflective micromirror 42 and the actuating components 43 are located under the micromirrors 42 to increase the effective reflective area. Also, electric circuits to operate the micromirrors can be replaced with known semiconductor microelectronics technologies such as MOS and CMOS. Applying the microelectronics circuits under micromirror array, the effective reflective area can be increased by removing necessary area for electrode pads and wires used to supply actuating power.

Figure 5:
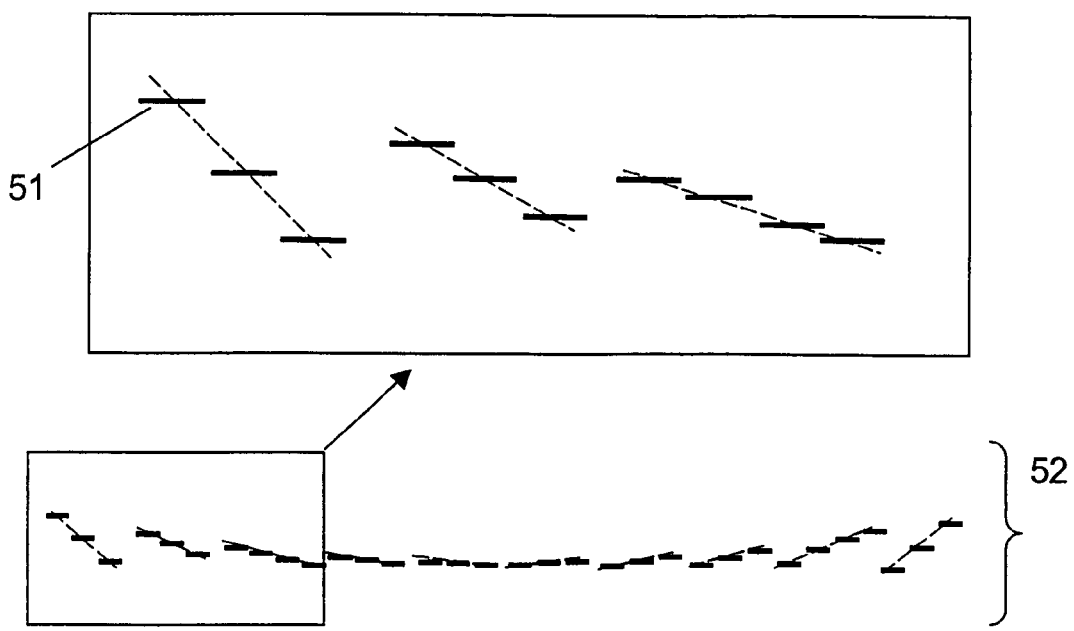
FIG. 5 is a schematic diagram showing the cut-away side view of the micromirror array lens comprising micromirrors with pure translation.

By fine control of the translational motion of each micromirror 51, more improved image can be obtained. FIG. 5 shows this graphically. Along the radial axis of lens, each zone contains several micromirrors 52. Since the phase variation in a zone is pi radian, the aberration of the lens is very large. If the size of each micromirror is controlled more precisely, the aberration of the lens can be decreased.

The independently controlled micromirror can forms a lens with arbitrary shape and/or size as desired. Incident lights can be modulated arbitrarily by forming an arbitrary shape and/or size lens. To do this, it is required that incident lights are deflected to desired arbitrary directions by controls of translation of each micromirror independently.

Figure 6:
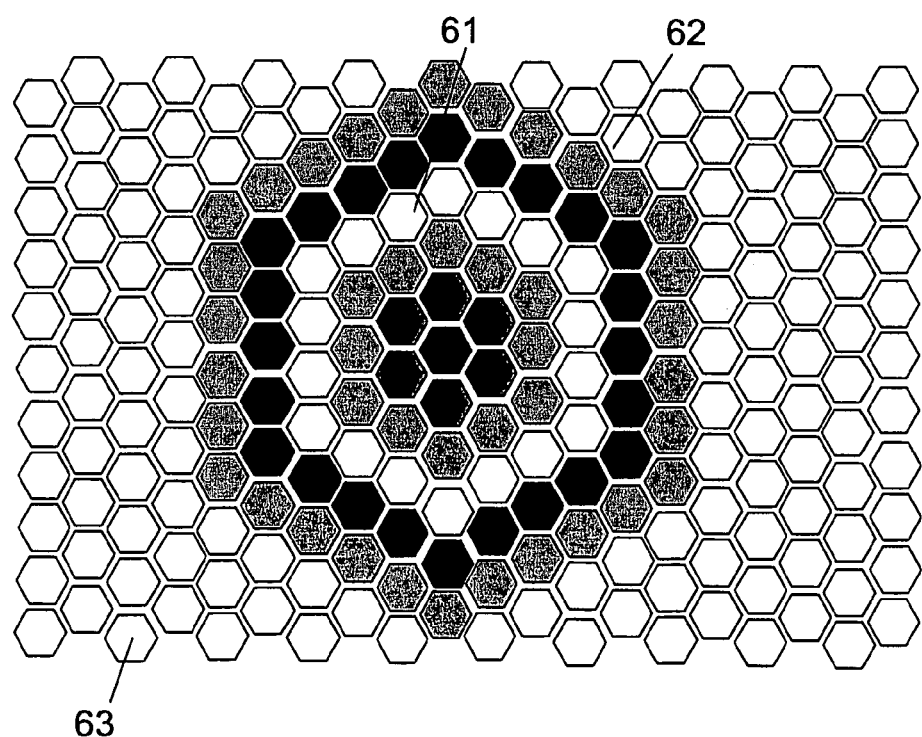
FIG. 6 is a schematic diagram showing one example of the micromirror array lens comprising hexagonal micromirrors with pure translation.

FIG. 6 shows an example of the micromirror array lens 62 comprising hexagonal micromirrors 61. Bright gray of each micromirror 61 represents large translation and dark gray of each micromirror 61 represents small translation. Micromirrors 63 which are not elements of the lens are controlled to make lights reflected by the micromirrors 63 not have influence or have less influence on imaging or focusing.

Fan shape, rectangle, square, and triangle micromirror array can be used for the micromirror lens. An array comprising fan shape micromirrors is appropriate to an axisymmetric lens. An array comprising square or rectangle micromirrors is appropriate to a symmetric lens about one axis of in-plane such as cylindrical lens. An array comprising triangular micromirrors is appropriate to a lens with desired arbitrary shape and/or size lens like an array comprising hexagonal micromirrors.

The micromirror array lens is an adaptive optical component because the phase of light can be changed by controlling the translations of micromirrors independently. Adaptive optical micromirror array lens requires two-dimensional arrays of individually controllable micromirrors. To achieve this, it is necessary to combine the micromirrors with on-chip electronics. In order to do this, wafer-level integration of micromirrors with the known microelectronics circuits is necessary.

The micromirror array lens can correct the phase errors since an adaptive optical component can correct the phase errors of light due to the medium between the object and its image and/or corrects the defects of a lens system that cause its image to deviate from the rules of paraxial imagery. For example, the micromirror array lens can correct the phase error due to optical tilt by adjusting the translations of micromirrors.

The same phase condition satisfied by the micromirror array lens contains an assumption of monochromatic light. Therefore, to get a color image, the micromirror array lens is controlled to satisfy the same phase condition for each wavelength of Red, Green, and Blue (RGB), respectively, and the imaging system can use bandpass filters to make monochromatic lights with wavelengths of Red, Green, and Blue (RGB).

If a color photoelectric sensor is used as an imaging sensor in the imaging system using a micromirror array lens, a color image can be obtained by processing electrical signals from Red, Green, and Blue (RGB) imaging sensors with or without bandpass filters, which should be synchronized with the control of micromirror array lens. To image Red light scattered from an object, the micromirror array lens is controlled to satisfy the phase condition for Red light. During the operation, Red, Green, and Blue imaging sensors measure the intensity of each Red, Green, and Blue light scattered from an object. Among them, only the intensity of Red light is stored as image data because only Red light is imaged properly. To image each Green or Blue light, the micromirror array lens and each imaging sensor works in the same manner as the process for the Red light. Therefore, the micromirror array lens is synchronized with Red, Green, and Blue imaging sensors. Alternatively, the same phase condition for a color image is satisfied by using the least common multiple of wavelengths of Red, Green, and Blue lights as effective wavelength for the phase condition. In this case, the micromirror array lens is not necessary to be controlled to satisfy the phase condition for each Red, Green, and Blue light individually. Instead, the phase condition for the least common multiple of the wavelengths should be satisfied.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A variable focal length lens comprising a plurality of micromirrors with one degree of freedom translation, wherein the one degree of freedom translation of the micromirrors is controlled to satisfy the same phase conditions for the lights, wherein the lens is a diffractive lens.

2. The lens of claim 1, wherein translation of the micromirrors is controlled to change the focal length of the lens.

3. The lens of claim 1, wherein all of the micromirrors are arranged in a flat plane.

4. The lens of claim 1, wherein the micromirrors are arranged to form one or more concentric circles to form the lens.

5. The lens of claim 4, wherein the micromirrors on each of the concentric circles are controlled by one or more electrodes corresponding to the concentric circle.

6. The lens of claim 1, wherein the micromirror has a fan shape.

7. The lens of claim 1, wherein the micromirror have a hexagonal shape.

8. The lens of claim 1, wherein the micromirror has a rectangular shape.

9. The lens of claim 1, wherein the micromirror has a square shape.

10. The lens of claim 1, wherein the micromirror has a triangle shape.

11. The lens of claim 1, wherein the reflective surface of the micromirror is flat.

12. The lens of claim 1, wherein the micromirrors are controlled independently.

13. The lens of claim 1, wherein the micromirrors are actuated by electrostatic force.

14. The lens of claim 1, wherein the micromirrors are actuated by electromagnetic force.

15. The lens of claim 1, wherein the micromirrors are actuated by electrostatic force and electromagnetic force.

16. The lens of claim 1, wherein a mechanical structure upholding micromirrors and actuating components are located under the micromirrors.

17. The lens of claim 1, wherein a control circuitry is constructed under the micromirrors by using semiconductor microelectronics technologies.

18. The lens of claim 1, wherein the surface material of the micromirror is the one with high reflectivity.

19. The lens of claim 1, wherein the surface material of the micromirror is metal.

20. The lens of claim 1, wherein the lens is an adaptive optical component, wherein the lens compensates for phase errors of light due to the medium between an object and its image.

21. The lens of claim 1, wherein the lens is an adaptive optical component, wherein the lens corrects aberrations.

22. The lens of claim 1, wherein the lens is an adaptive optical component, wherein the lens corrects the defects of an imaging system that cause the image to deviate from the rules of paraxial imagery.

23. The lens of claim 1, wherein the lens is an adaptive optical component, wherein an object which does not lie on the optical axis can be imaged by the lens without macroscopic mechanical movement.

24. The lens of claim 1, wherein the lens is controlled to satisfy the same phase condition for each wavelength of Red, Green, and Blue (RGB), respectively, to get a color image.

25. The lens of claim 1, wherein the lens is controlled to satisfy the same phase condition for one wavelength among Red, Green, and Blue (RGB) to get a color image.

26. The lens of claim 1, wherein the same phase condition for color imaging is satisfied by using the least common multiple of wavelengths of Red, Green, and Blue lights as an effective wavelength for the phase condition.

27. The lens of claim 1, wherein the surface material of the micromirror is made of high reflective dielectric coatings.

28. The lens of claim 1, wherein the surface material of the micromirror is made of metal compound.

* * * * *